L. R. McDONALD.
CONSTANT SPEED VIBRATING MOTOR AND METHOD.
APPLICATION FILED DEC. 28, 1916.

1,396,335.

Patented Nov. 8, 1921.

INVENTOR=
LESLIE R. McDONALD

By Roberts, Roberts & Cushman
HIS ATTORNEYS=

L. R. McDONALD.
CONSTANT SPEED VIBRATING MOTOR AND METHOD.
APPLICATION FILED DEC. 28, 1916.
1,396,335.
Patented Nov. 8, 1921.
2 SHEETS—SHEET 2.
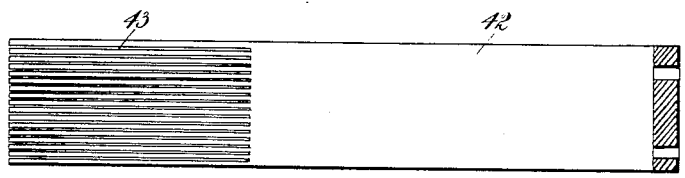
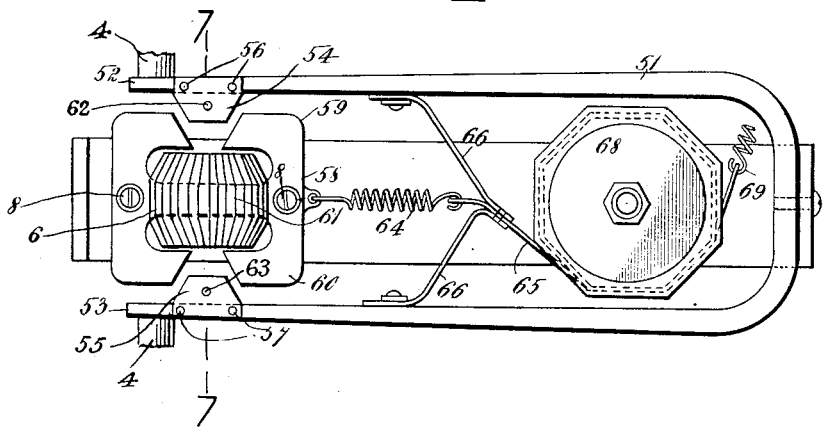
INVENTOR=
LESLIE R. McDONALD
By Roberts Roberts & Cushman
HIS ATTORNEYS=

UNITED STATES PATENT OFFICE.

LESLIE R. McDONALD, OF MONTREAL, QUEBEC, CANADA, ASSIGNOR TO MARGUERITE V. O'LEARY, OF MONTREAL, QUEBEC, CANADA.

CONSTANT-SPEED VIBRATING MOTOR AND METHOD.

1,396,335.   Specification of Letters Patent.   Patented Nov. 8, 1921.

Application filed December 28, 1916. Serial No. 139,333.

*To all whom it may concern:*

Be it known that I, LESLIE R. McDONALD, a citizen of the United States, and resident of Montreal, in the Province of Quebec and Dominion of Canada, have invented new and useful Improvements in Constant-Speed Vibrating Motors and Methods, of which the following is a specification.

This invention relates to a motor comprising one or more vibratory members and to a method of and means for regulating the speed of a motor of this type. More particularly the invention relates to an electric motor comprising a rotary member, oscillatory means making frictional engagement with the rotary member when moving in one direction for continuously rotating the member, and means to produce a regularly varying magnetic field having a frequency of variation substantially equal to the natural frequency of oscillation of the oscillatory means for actuating the oscillatory means.

A motor of this character is simple, durable and highly efficient. It is adapted to produce a large torque at a relatively low angular velocity and is adapted to be operated by vibratory current such as, for example, the ordinary commercial current alternating at sixty cycles per second. Such a motor is particularly useful for operating phonographs, advertising devices, display tables, and the like, where it is desirable to employ commercial alternating current to drive the apparatus at comparatively low speed. The motor obviates the usual transmission mechanism for transforming high velocity rotation into low velocity rotation, the low velocity rotation being produced directly and far more efficiently.

The principal object of this invention is to provide a method of and means for controlling the angular velocity of the driven member, and more particularly for maintaining the rotary member in synchronism with the vibratory member or members, that is, maintaining a constant ratio between the revolutions of the rotary member per unit of time and the vibrations of the vibratory member or members per unit of time, and this notwithstanding variations in the load applied to the rotary member. This object is preferably attained either by making the natural frequency of the vibration members less than the frequency of application of the vibratory magnetic field or other force, or by employing a polygonal rotary member, or both. Another object is to improve the means whereby the electromagnet imparts energy to the vibratory members so that the efficiency of the apparatus is increased. And a further object of the invention is to eliminate heating of the vibratory members, when subjecting them to a vibratory magnetic field, and this I preferably accomplish either by securing laminated armatures on the vibratory members or by laminating or slotting the portion or portions of the vibratory members subjected to the alternating or pulsating field.

Other objects of the invention will be apparent from the following description and the accompanying drawing, in which—

Fig. 5 is a side elevation of a slotted vibratory member;

Fig. 6 is a plan view of a modified embodiment of my invention, parts being omitted; and Fig. 7 is a vertical transverse section on the line 7—7 of Fig. 6.

Figure 1:
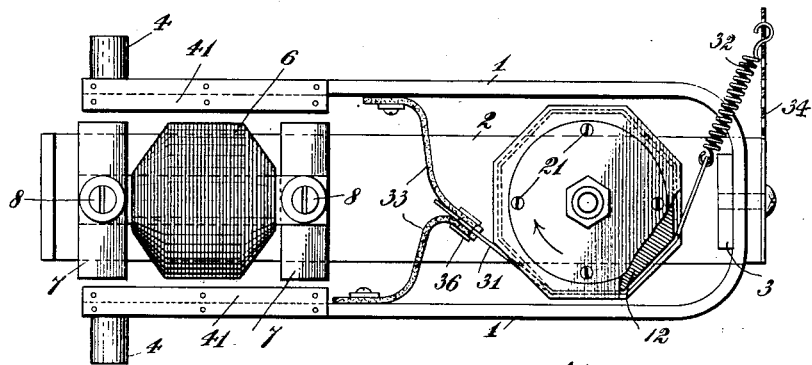
Figure 1 is a plan view of one embodiment of the invention, a part being broken away.

The particular embodiment of the invention disclosed in Figs. 1 to 4 comprises vibratory members 1 arranged in the form of a tuning fork and mounted on one end of a U-shaped supporting member 2 by means of machine screws threaded into the plate 3. Weights 4 are preferably mounted at or near the free ends of the vibratory members to give the members the desired natural period of vibration, and in order to adjust the period of vibration of the device these weights may be made adjustable if desired, either with respect to their magnitude or with respect to their longitudinal positions on the vibratory members.

An electromagnet comprising a field coil 6 and laminated pole pieces 7 is mounted near the opposite end of the U-shaped support 2 with the faces of the pole pieces disposed in planes parallel with but slightly displaced from the vibratory members. The means for supporting the electromagnet comprises machine screws 8 which pass through the pole pieces and are threaded in the openings 9 in the U-shaped supporting member, two tubular spacing members 11 being disposed around the machine screws between the pole pieces and the U-shaped support to position the electromagnet with relation to the vibratory members.

The rotary portion of the motor comprises a pulley 12 mounted on a shaft 13, which rotates in the bearing 14, the bearing 14 being threaded into the opening 16 of the U-shaped member 2. For a purpose hereinafter explained the pulley 12 is made polygonal, the number of sides depending on the rate and amplitude of vibration of the vibratory members, the stiffness and weight of the belt, the tension on the belt, etc. The pulley is also made of considerable thickness in order to afford sufficient weight for it to function also as a flywheel.

Figure 4:
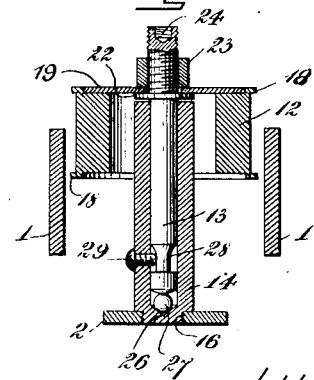
Fig. 4 is a vertical transverse section taken on line 4—4 of Fig. 2, parts being omitted.

Around the edges of the pulley, as shown in Fig. 4, are provided raised portions 18 to serve as guides for the pulley belt. On the upper side of the pulley is secured, by means of machine screws 21, a disk 19 having an aperture in the center thereof to receive the shaft 13. The shaft 13 is provided with a flange 22 and has a portion thereof extending above the flange threaded to receive a nut 23 for clamping the disk 19 between the flange and the nut, thereby rigidly to secure the pulley to the shaft. The upper end of the shaft is internally threaded at 24 to provide means for connecting the rotary portion of the motor with the device to be driven thereby. The lower end of the bearing 14 is recessed at 26 to receive the ball bearing 27, the latter being provided to support the shaft 13. The shaft 13 is provided with a groove 28 coöperating with a machine screw 29 threaded through the bearing 14 to prevent the shaft from being accidentally withdrawn from the bearing.

The means by which the vibratory members 1 produce rotation of the pulley 12 comprises a belt 31 contacting with a portion of the periphery of the pulley, and being secured at one end to the vibratory members and at the other end to the spring 32. The means for connecting the belt to the vibratory members preferably comprises two straps 33, which are respectively secured to the vibratory members in any suitable manner, and which are secured to each other and to the belt by suitable means, as for example, the rivet 36. The spring 32 is supported on the U-shaped member 2 by means of a plate 34 having a series of openings so that the spring can be connected to either one of the openings and thereby permit adjustment of the tension of the spring. The belt 31 is preferably made of impregnated fibrous material, and is preferably arranged to contact with the pulley through an angle of at least 360° in order to afford considerable frictional bearing surface between the bearing and the pulley. However, when employing a heavier belt, as for example a leather belt, it may be desirable to have the belt contact with only a small portion of the periphery of the pulley, for example, through an arc of ninety degrees or less.

Figure 3:
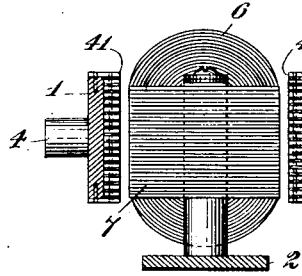
Fig. 3 is a vertical transverse section taken on line 3—3 of Fig. 2.

I have found that a motor of this character heats to a considerable extent throughout the portions subjected to the vibratory magnetic field, when employing alternating current, and for this reason I propose to provide the vibratory members with laminated portions throughout the sections subjected to the magnetic field. In the particular embodiment of the invention herein disclosed, only the ends of the vibratory members are subjected to the magnetic field, and undue heating of these portions can be prevented by attaching laminated armatures 41 to the inner faces of the vibratory members adjacent the electromagnet 6 as illustrated in Figs. 1 and 3.

Another means of preventing undue heating comprises slotting the vibratory members throughout the portion subjected to the vibratory magnetic field, as illustrated in Fig. 5 wherein 42 represents a portion of a vibratory member and 43 represents longitudinal slots throughout the portion adjacent the free end of the vibratory member.

The embodiment illustrated in Figs. 6 and 7 comprises a vibratory member 51 in the form of a tuning fork having two free vibratory ends 52 and 53. Upon the inside faces of the vibratory member adjacent its ends are mounted two armatures 54 and 55 by means of machine screws 56 and 57 or other suitable means. Between the free ends of the vibratory member is mounted a field core 58 by suitable means as, for example, the means shown in Figs. 1 and 2. The preferred form of field core comprises two branches 59 and 60, the two branches having a common portion 61 intended to receive a field coil (not shown) for the purpose of directing the magnetic flux through the two branches 59 and 60 in parallel. The branches 59 and 60 of the magnetic circuit are provided with air gaps in opposition to the corresponding armatures 54 and 55 so that the armatures move inwardly with respect to the air gaps when the free ends of the vibratory member move together.

While it is not essential, the air gaps are preferably made wedge-shaped by outwardly flaring the opposing surfaces of the pole pieces constituting the branch circuits 59 and 60, and the armature is then provided with oblique faces disposed in substantial parallelism with the faces of the pole pieces, so that as the armatures move inwardly with respect to the air gaps the air spaces between the opposing surfaces of the pole pieces and armature respectively, decrease in length. Thus, when a current is caused to flow through the field coil surrounding the portion 61 of the core, magnetic flux is caused to flow through the branch magnetic circuits across the air gaps and through the armatures, thereby causing the armatures to move inwardly. As the current decreases, the resiliency of the vibratory members causes the members to move apart, and by suitably varying the current through the field coil the free ends of the vibratory member may be caused continuously to vibrate back and forth.

As illustrated in Fig. 7, the armatures and field core are preferably laminated so as to reduce heating of the parts subjected to the alternating magnetic field when operating the motor with alternating current. The laminations may be secured together in any suitable manner, as for example, by means of pins 62 and 63 extending through the laminations. In this embodiment of the invention the vibratory member 51 may either be formed of magnetic material such as steel, or non-magnetic material, such as brass. However, when employing alternating current and laminated armatures, it may be more desirable to employ non-magnetic material so that the alternating magnetic flux will be confined substantially wholly to the laminated armatures. When employing magnetic material the armatures may be formed integrally with the vibratory members in the form of projections, in which event the armatures are preferably slotted as are the vibratory members in Fig. 5, in order to eliminate undue heating.

In Fig. 6 I have illustrated other features of my invention, namely, making the vibratory members thicker near their fixed ends than at the free ends and gradually tapering them from the fixed to the free ends; and the use of a yielding means in the form of a spring 64 connected to the end of the belt 65 which is attached to the vibratory members through the medium of the flexible members 66. While I have shown the spring 64 connected at one end to the extreme end of the belt and at the other end to the pole piece 58, the spring may, if desired, be connected to the belt at a point nearer the pulley 68 or to a point of the flexible member 66. I have found that spring 64 reduces the noise produced by a motor of this character and that it largely increases the efficiency of the apparatus. The vibratory members appear to produce a wave motion in the belt and I believe the principal function of the spring to be to assist in producing this wave motion. For example, as the vibratory members move together, the spring 69 moves the belt in a counter-clockwise direction and the spring 64 moves the belt at its left-hand end away from pulley 68. As the vibratory members move apart, the belt is moved in a clockwise direction and the tension of spring 64 is overcome to such an extent as to move the left-hand end of the belt toward the pulley. Thus, the spring appears to produce a transverse movement of that end of the belt connected to the vibratory members and this transverse movement obviously tends to produce a wave motion in the belt or to accentuate the wave motion produced in the absence of the spring 64. The tapered shape of the vibratory members has the important advantage of distributing the flexure of the vibratory members more uniformly throughout their length, thus overcoming the disadvantages incident to vibratory members of uniform thickness wherein the flexure is largely confined to those portions adjacent the fixed ends of the members.

When employing sixty cycle current, for example, which produces 120 vibrations of the vibratory members per minute, and when employing a rotary member of considerable inertia, the rotary member is caused to rotate at substantially uniform velocity. Ordinarily a motor of this character will vary in speed inversely as the load varies, that is, as the load increases the angular velocity of the rotary member tends to decrease and vice versa. One method of overcoming this tendency which I have discovered, comprises employing a recurrent force whose periodicity is slightly greater than that to which the vibratory members are tuned. The effect of this is to produce a tendency for the rotary member to increase in velocity as the load increases, thereby counteracting the normal tendency for the rotary member to decrease in angular velocity as the load increases.

This, I believe to be due to the fact that the application of a considerable load to the vibratory members through the medium of the belt and the pulley increases the natural frequency of the vibratory members so that the motor operates under load substantially as though the vibratory members were in tune with the recurrent force applied thereto, while when the load decreases the vibratory members tend to lag behind the recurrent force, the effect of the lag being to reduce the amplitude of vibration of the members.

Even better results can be obtained by employing with the above method a polygonal rotary member and employing as a part of the above method the following, namely, suitably determining the number of sides of the rotary member in view of the rate and amplitude of vibration of the vibratory members, the weight and stiffness of the belt, the tension of the belt, the frequency of the magnetic impulses or other recurrent forces applied to the vibratory members, etc. With the number of sides suitably determined, the rotary member is caused to rotate through the arc subtended by exactly one side or by an integral number of sides for each vibration of the vibratory members. Of course, the rotary member does not rotate by steps separated by intervals of rest, but the substantially constant velocity is such that the velocity bears a definite relation to the rate of vibration of the vibratory members, and this relationship exists throughout a considerable range of values for the various factors above enumerated, that is, the number of sides need not correspond to exact values of the various constants. For example, if the number of sides is approximately correct, either the rate or the amplitude of vibration of the vibratory members may vary considerably without causing the rotary member to be thrown out of synchronism therewith. Furthermore, the tension on the spring may be varied somewhat, and what is most important, the load may be varied through wide limits without throwing the rotary member out of synchronism with the vibratory members. Thus, if the alternating current supplied to coil 6 remains substantially constant in frequency the angular velocity of the rotary member will remain substantially constant.

This I believe to be due at least in part to the fact that the most effective portion of the belt is that part adjacent the end connected to the vibratory members, the "slap" of this portion against the pulley at each vibration of the vibratory members apparently applying much greater driving force to the pulley than any other part of the belt; consequently, when employing a polygonal pulley of approximately the proper number of sides, a side is presented to this portion of the belt at the proper instant to receive a slap. If the pulley tends to rotate too fast due to a decrease in load the slap is applied in a slightly different manner, thereby overcoming the tendency to increase in speed, and if the pulley tends to lag behind the vibratory members due to increased load the slap is so applied that the driving force is increased thereby causing the rotary member to remain in synchronism with the vibratory members.

While under certain circumstances it may be desirable to employ the method involving both of the above described phenomena, either one of them may be used alone with very satisfactory results, and I do not, therefore, desire to be limited to the use of the method as a whole, but I desire to be protected in the use of either part of the method as a sub-method.

The term "continuously rotating" has been employed in the claims particularly to signify that the rotation of the driven member is continuously in the same direction, although in fact the rotation is also continuous in the sense that it is unbroken. The term "oscillatory means" may include either the belts or the tuning fork prongs or both. With reference to the vibratory current for example, such terms as "frequency of variation" mean the number of complete cycles of variation of pulsatory direct current occurring per unit of time or the number of half cycles of alternation of alternating current occurring per unit of time, the alternating current having two alternations per complete cycle and producing two vibrations of the vibratory member per complete cycle.

The term "oscillatory magnetic means" is employed in the claims to designate oscillatory means consisting either wholly or partly of magnetic material, the term therefore including structure such as illustrated in Fig. 6, wherein the armatures 54 and 55 are of magnetic material, while the vibratory members 51 may or may not be formed of magnetic material.

Figure 2:
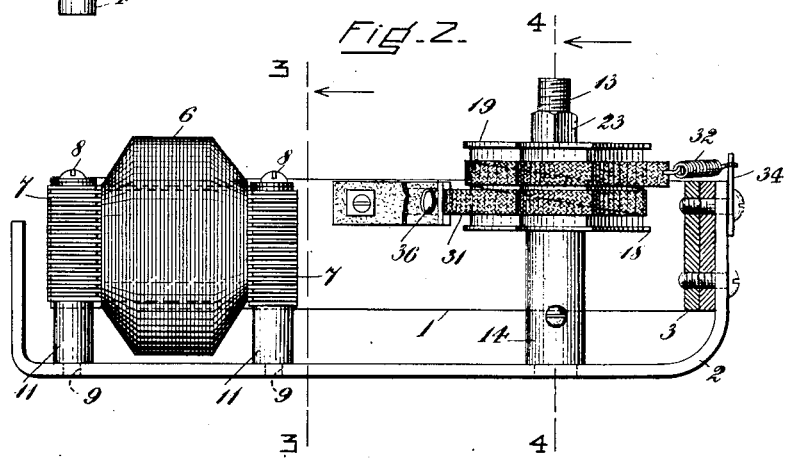
Fig. 2 is a side elevation of the apparatus, parts being broken away.

The term "wedge-shaped", as applied to the armatures and air gaps in structure such as that shown in Fig. 6, is employed to define a general wedge shape and is not limited to the shape of a wedge having flat faces; on the contrary the faces may be either concave or convex, or they may be given any other suitable contour so long as the general wedge-shaped character is maintained, this general shape being preferable inasmuch as the air gaps are made to vary in length when employing this shape, the pull on the armatures is rendered more nearly constant as the armatures move inwardly, and the air gaps are maintained more nearly constant in length than when employing pole pieces of the character shown in Figs. 1 to 3, inclusive.

This patent is in part a continuation of my application Serial Number 104,095 filed June 16, 1916.

I claim:

1. In a motor comprising a rotary driven member and a vibratory driving member, the method of maintaining the angular velocity of the rotary member substantially constant throughout variations in load comprising applying a recurrent force to the vibratory member, the frequency of recurrence of which is somewhat in excess of the natural frequency of vibration of the vibratory member.

2. In a motor comprising a vibratory member arranged to vibrate in synchronism with a regularly recurring force of suitable frequency, combination of a rotary member arranged to be continuously rotated by the vibratory member, and means for compensating for the tendency of the rotary member to vary in angular velocity inversely with variations in the load applied thereto said means comprising a weight applied to the freely moving ends of the vibratory member in excess of the amount required to give the vibratory member a natural period of vibration equal to the period of the recurring force.

3. A motor comprising a rotary member, a vibratory member, means for driving the rotary member from the vibratory member, and means for applying a recurrent force to the vibratory member, the frequency of said recurrent force being greater than the normal frequency of the vibratory member.

4. Motor apparatus comprising a vibratory member, a polygonal rotary member, and a tensioned belt connecting with the vibratory member and contacting with the periphery of the rotary member so that the rotary member is continuously rotated by the vibration of the vibratory member.

5. Motor apparatus comprising a polygonal rotary member, and oscillatory means comprising a flexible belt contacting with the periphery of the polygonal member so as continuously to rotate the rotary member, the oscillatory means being arranged to rotate the rotary member through the angle subtended by one or more sides for each oscillation of the oscillatory means, whereby the rotary member is maintained in synchronism with the oscillatory means.

6. Motor apparatus comprising a vibratory member, a polygonal rotary member, and a tensioned belt connecting with the vibratory member and contacting with the periphery of the rotary member so that the rotary member is continuously rotated by the vibration of the vibratory member, the vibratory member and belt being arranged to rotate the rotary member through the angle subtended by one or more sides for each vibration of the vibratory member, whereby the rotary member is maintained in synchronism with the vibratory member notwithstanding variations in load.

7. Motor apparatus comprising a polygonal rotary member, opposed vibratory members, means comprising a flexible belt connecting with the vibratory members and contacting with the rotary member for continuously rotating the rotary member in synchronism with the vibratory members.

8. Motor apparatus comprising oscillatory magnetic means and stationary magnetic means, one of said means having an opening and the other of said means having a projection, means for mounting said two means with relation to each other so that the oscillation of the oscillatory means causes said projection to move inwardly and outwardly with respect to said opening, and means to direct a varying magnetic flux across said opening through said projection and in such manner that one side of said opening comprises one pole and the other side comprises the opposite pole, thereby to oscillate said oscillatory means.

9. Motor apparatus comprising oscillatory magnetic means and stationary magnetic means, one of said means being provided with an opening having outwardly flaring sides and the other of said means being provided with a wedge-shaped projection, means for mounting said two means so that the oscillation of the oscillatory means causes said projection to move inwardly and outwardly with respect to said opening, and means to direct a varying magnetic flux across said opening through said projection and in such manner that one side of said opening comprises one pole and the other side comprises the opposite pole, thereby to oscillate said oscillatory means.

10. Motor apparatus comprising a non-magnetic vibratory member, a wedge-shaped armature of magnetic material secured to the vibratory member, a field core having a V-shaped opening disposed in opposition to the armature, and means for directing a variable magnetic flux across said opening through the armature and in such manner that one side of said opening comprises one pole and the other side comprises the opposite pole, thereby to vibrate the vibratory member to and from the field core.

11. Motor apparatus comprising a vibratory member, a magnetic circuit having opposed pole pieces, the faces of the pole pieces being flared outwardly to form a wedge-shaped gap therebetween, a wedge-shaped armature connected to the vibratory member so as to move inwardly and outwardly with respect to said wedge-shaped gap, and means to direct a variable magnetic flux through said magnetic circuit across said gap and through said armature and in such manner that one side of said gap comprises one pole and the other side comprises the opposite pole, thereby to vibrate the vibratory member to and fro.

12. Motor apparatus comprising a vibratory member in the form of a tuning fork, armatures mounted on the inside of the free ends of the vibratory member, a field core mounted between the free ends of the vibratory member, the field core having air gaps arranged in opposition to the said armature so that when the core is energized magnetic flux is directed across said gaps and through the armature thereby causing the armatures to be drawn inwardly with respect to said air gaps, and means for variably energizing the field core and in such manner that one side of said gaps comprises one magnetic pole and the other side of said gaps comprises the opposite magnetic pole, thereby to vibrate the vibratory member.

13. Motor apparatus comprising a vibratory member in the form of a tuning fork, armatures mounted on the inside of the free ends of the vibratory member, a field core mounted between the free ends of the vibratory member, the field core having two branches and a portion common to each branch, a field coil surrounding said common portion and said branches having air gaps respectively arranged in opposition to said armatures so that when the core is energized magnetic flux is directed across said gaps and through the armatures thereby causing the armatures to be drawn inwardly with respect to said gaps, and means for variably energizing said field coil, thereby to vibrate the vibratory member.

14. Motor apparatus comprising a vibratory member, a rotary member, a tensioned belt connecting with the vibratory member and contacting with the rotary member so as to rotate the rotary member as the vibratory member vibrates, and yielding means connected to the belt intermediate the said members so as to exert a force transversely of the belt.

15. Motor apparatus comprising a vibratory member, a rotary member, a tensioned belt connecting with the vibratory member and contacting with the rotary member so as to rotate the rotary member as the vibratory member vibrates, and means intermediate the said members yieldingly to urge the belt in a direction away from the pulley.

16. Motor apparatus comprising a vibratory member in the form of a tuning fork, a rotary member, a tensioned belt connecting at one end with each prong of the tuning fork and contacting with the periphery of the rotary member so as to rotate the rotary member as the vibratory member vibrates, and yielding means connecting with the said end of the belt yieldingly to urge the belt in a direction away from the pulley.

17. Motor apparatus comprising a vibratory member in the form of a tuning fork, a rotary member, a flexible member extending between and connecting with the prongs of the fork, a belt connecting with the flexible member intermediate the prongs and contacting with the rotary member, means normally to tension the flexible member and belt so as to keep the belt in contact with the rotary member, and yielding means connecting with the flexible member so as to urge the belt in a direction away from the rotary member.

18. In a motor comprising a vibratory member arranged to vibrate in synchronism with a regularly recurring force of suitable frequency, and a rotary member arranged to be continuously rotated by the vibratory member, the method of maintaining the angular velocity of the rotary member constant during variable loads comprising varying the effective action of the recurrent force in proportion to the amount of load whereby the rotary member will continue to rotate in synchronism with the vibratory member.

19. The method of maintaining the angular velocity of a rotary member constant during variable loads comprising varying the effective leverage of the recurrent force in proportion to the amount of load whereby the driven member will continue to rotate in synchronism with the driving member.

Signed by me at Montreal, Canada, this first day of December, 1916.

LESLIE R. McDONALD.